(12) United States Patent
Schradi et al.

(10) Patent No.: US 6,909,407 B1
(45) Date of Patent: Jun. 21, 2005

(54) DEVICE AND METHOD FOR DISPLAYING PICTOGRAMS IN A VEHICLE

(75) Inventors: Stefan Schradi, Villingen-Schwenningen (DE); Rainer Lemke, Trossingen (DE); Jürgen Adams, Villingen-Schwenningen (DE); Michael Klostermeier, Martinsried (DE); Josef Spaderna, Weichs (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/390,532

(22) Filed: Sep. 3, 1999

(30) Foreign Application Priority Data

Sep. 16, 1998 (DE) ........................................ 198 42 286

(51) Int. Cl.$^7$ ................................................ G09G 5/00
(52) U.S. Cl. ........................ 345/7; 345/173; 345/156; 345/157; 345/8; 345/9; 715/841; 715/856
(58) Field of Search ................................ 345/7–9, 173, 345/156, 157, 87, 204, 804, 467, 854, 839, 837, 841, 829, 856; 715/841, 856; 702/50, 189

(56) References Cited

U.S. PATENT DOCUMENTS

| | | | | |
|---|---|---|---|---|
| 5,347,293 A | * | 9/1994 | Wiedemann et al. | ......... 345/87 |
| 5,388,203 A | * | 2/1995 | Kaneko | ....................... 345/837 |
| 5,491,795 A | * | 2/1996 | Beaudet et al. | ............. 345/804 |
| 6,005,549 A | * | 12/1999 | Forest | ....................... 345/157 |
| 6,009,355 A | * | 12/1999 | Obradovich et al. | ........... 701/1 |
| 6,104,399 A | * | 8/2000 | Volkel | ........................ 345/841 |

FOREIGN PATENT DOCUMENTS

| | | | |
|---|---|---|---|
| DE | 19842286 C1 | * | 9/1998 |
| EP | 0005436 | | 11/1981 |

* cited by examiner

*Primary Examiner*—Xiao Wu
*Assistant Examiner*—Kevin M. Nguyen
(74) *Attorney, Agent, or Firm*—Martin A. Farber

(57) ABSTRACT

A device for displaying pictograms in a vehicle wherein the device comprises a control unit and a display unit, in particular an LCD display unit, the control unit controlling the display unit, and a method for operating the device, wherein a) the display unit is divided into symbol fields (2, 3, 4, 5, 6) which are arranged one next to the other in a row, the control unit only ever displaying one pictogram in each symbol field simultaneously, b) the control unit always displays in a specific symbol field (2) each new pictogram which is to be displayed in the symbol fields (2, 3, 4, 5, 6) which are arranged one next to the other in a row, and displaces by one symbol field the pictograms which have already been displayed, without changing their order, c) a control element (13) is provided with which a coherent section of the pictograms which are arranged one next to the other in a row can be displayed in the symbol fields of the display unit if more pictograms are to be displayed simultaneously than symbol fields which are present on the display unit.

The method includes proposals for operating this device.

9 Claims, 4 Drawing Sheets

DEVICE AND METHOD FOR DISPLAYING PICTOGRAMS IN A VEHICLE

FIELD AND BACKGROUND OF THE INVENTION

The invention relates to a device for displaying pictograms in a vehicle comprising a control unit and a display unit, in particular an LC display, the control unit controlling the display unit.

The dashboards of, in particular, utility vehicles and buses are equipped with a plurality of symbol lights in order to provide the driver with various information. Since the equipment in modern vehicles increasingly includes electronic control and instrumentation equipment and consequently the driver has to be made aware of more and more information, attempts are being made to find devices which can display the increasing amount of information in a manner which is easily manageable and can be satisfactorily perceived by the driver. Thus, recently, central information modules have become known which comprise an LC display which is arranged in the dashboard in the direct field of vision of the driver and on which information is displayed according to requirements by means of an electronic control unit.

The information which is to be displayed to the driver is often information on the operational status of devices in the vehicle. Moreover, the driver has to be made aware, quickly and in an easily comprehensible way, of faults in devices in the vehicle and of warnings of hazards. For this purpose, the devices in the vehicle or the activation devices which are assigned to them usually output specific messages in the form of electrical signals, which messages are displayed by the display means arranged in the dashboard. Irrespective of whether conventional symbol lights or the display unit of an information module are used as a display means, it has become a widespread practice to present such messages by means of standardized pictograms communicating to the driver the respective information by means of their stylized representation of a specific device in the vehicle.

Because the number of symbol lights in the dashboard had to be reduced for ergonomic reasons and for reasons of cost, central optoelectronic information modules are being used with increasing frequency. However, it is also the case with these information modules that for technical and economic reasons the available active display area of the display unit cannot be increased as desired in order to display the increasing amount of simultaneously occurring messages. For ergonomic reasons and for reasons of safety it is also not sensible to display a large number of messages simultaneously because the driver can only ever absorb a specific amount of information simultaneously and an excessively large quantity of information could also distract him from his actual task of driving. Neither is it possible to reduce the size of the pictograms in order to be able to display simultaneously more pictograms on the available active display area of the display unit because this also infringes legal regulations for maintaining good legibility and clear recognizability.

SUMMARY OF THE INVENTION

The object of the present invention is to provide a device and a method for displaying pictograms in a vehicle, the device being composed of a control unit and a display unit, in particular an LC display unit, and the control unit controlling the display unit in which device a plurality of simultaneously present messages about the operational status of various devices in the vehicle are also displayed in an easily perceptible fashion in the form of pictograms.

The solution relating to the device is distinguished by the fact that a) in a device composed of a control unit and a display unit, in particular an LC display unit, for displaying pictograms in a vehicle, the display unit is divided into symbol fields which are arranged one next to the other in a row, the control unit only ever displaying one pictogram in each symbol field simultaneously, b) the control unit always displays in a specific symbol field each new pictogram which is to be displayed in the symbol fields which are arranged one next to the other in a row, and displaces by one symbol field the pictograms which have already been displayed, without changing their order, c) a control element is provided with which a coherent section of the pictograms which are arranged one next to the other in a row can be displayed in the symbol fields of the display unit if more pictograms are to be displayed simultaneously than symbol fields which are present on the display unit.

This solution has the advantage that the latest messages are always displayed, and the driver always looks at a stationary display which appears still. If the driver wishes to look at older messages which are not currently being displayed, he can easily do this by activating the control element which is provided, because the control element can be used to cause a coherent section from the row of already displayed pictograms to be displayed in the symbol fields present in the display unit.

BRIEF DESCRIPTION OF THE DRAWINGS

The invention will now be explained in more detail with reference to figures of the drawings, in which.

DETAILED DESCRIPTION OF THE PREFERRED EMBODIMENT

Figure 1:
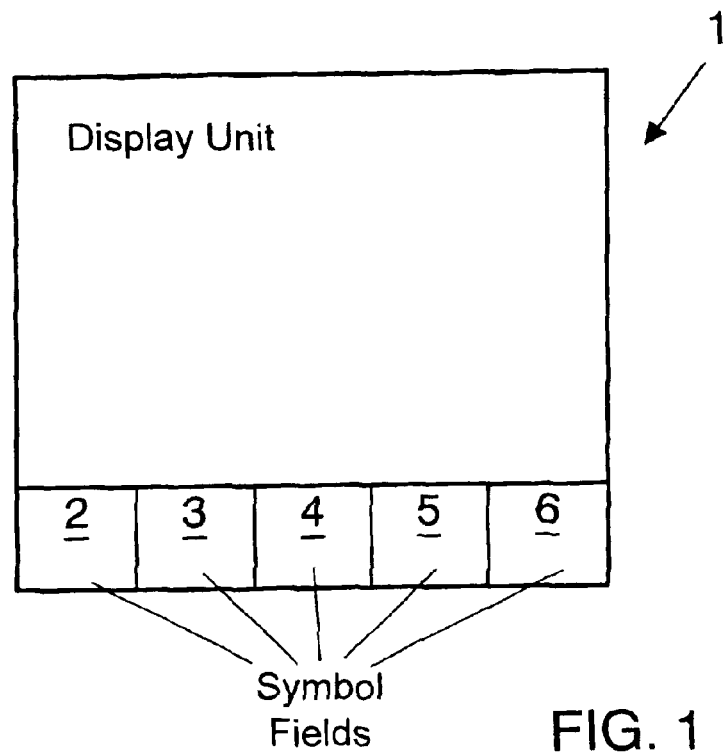
FIGS. 1–8 show control and display units, symbol fields, and pictograms.

FIG. 1 shows a display unit 1 in the lower part of whose active display area a row of, for example, five symbol fields 2, 3, 4, 5, 6 is arranged. Depending on the actual design—in particular the size of the active display area—of the display unit selected in the implementation, the number of symbol fields may be larger or smaller than in this example. The upper part of the active display area should be reserved for purposes other than the display of pictograms. Here, it would be possible, for example, to display messages from a navigation system or texts.

Figure 2:
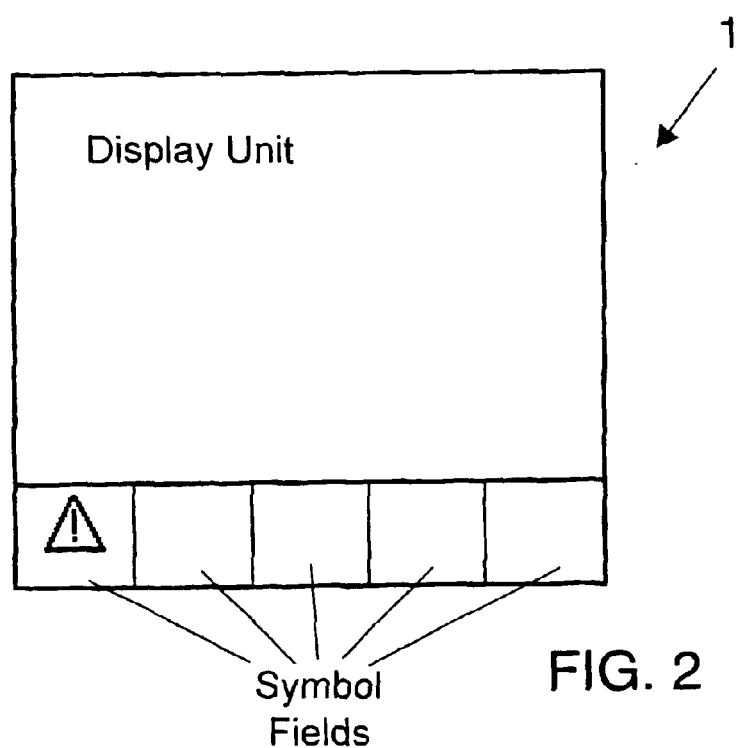

If measuring control or instrumentation equipment of the vehicle outputs a message which informs the viewer of the display unit, i.e. as a rule the driver of the vehicle, of, for example, an operational status, makes him aware of a fault or warns him of a hazard, a pictogram which is assigned to this message is displayed in accordance with FIG. 2 in that the control unit which controls the display unit displays the corresponding pictogram in one of the symbol fields present in the display unit. It is advantageous firstly to represent each pictogram which is to be newly displayed in a quite specific symbol field of the row of symbol fields because such a definition makes it possible, in a way which the driver can easily notice, to define a time priority for the pictograms which are to be displayed. In the example which is illustrated here, each pictogram which is to be newly displayed is firstly to be displayed in the symbol field 2 which is to the left of the viewer.

Figure 3:
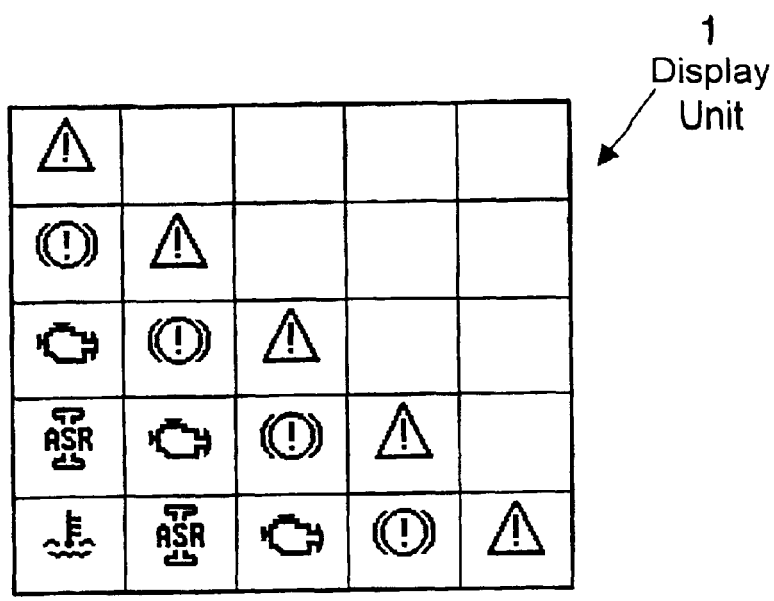

FIG. 3 shows what happens, according to the invention, if additional pictograms have to be displayed owing to further messages which are present simultaneously or messages which have to be displayed persistently. In this figure, as in the following figures also, for the sake of simplicity the upper part of the active display area of the display unit 1 is no longer illustrated because it is not relevant to the invention. Instead, a plurality of chronologically successive display situations are illustrated in a combinatory block, each line of a block corresponding to a specific display situation.

As mentioned, each pictogram which is to be newly displayed is firstly displayed in the symbol field 2, i.e. with, for the viewer, left-hand alignment in the row of symbol fields, pictograms which have already been displayed being displaced out of the view of the viewer to the right by one symbol field in each case. As a result, as is clear from FIG. 3, an uninterrupted sequence of pictograms is produced, the latest message being on the left in this row and the oldest on the right. This arrangement makes it very clear in which chronological sequence the messages which are displayed by the pictograms have occurred. The fact that the latest message is always displayed by the pictogram in the left-hand symbol field is an advantageous, but in no way necessary, convention for European-language-speaking countries. For users whose preferred direction of reading is from right to left, there could be a convention that the latest message is in the right-hand symbol field in the row of symbol fields, all the subsequent messages then bringing about a displacement of the pictograms to the left.

Figure 4:
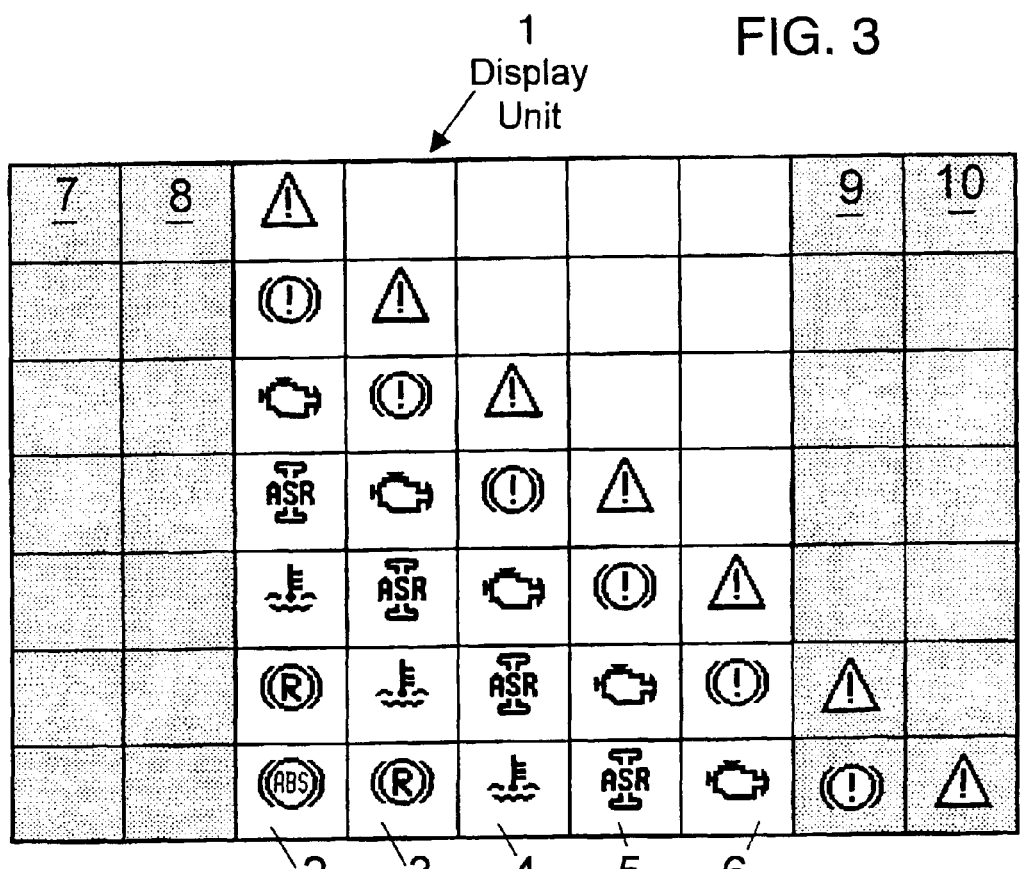
Figure 5:
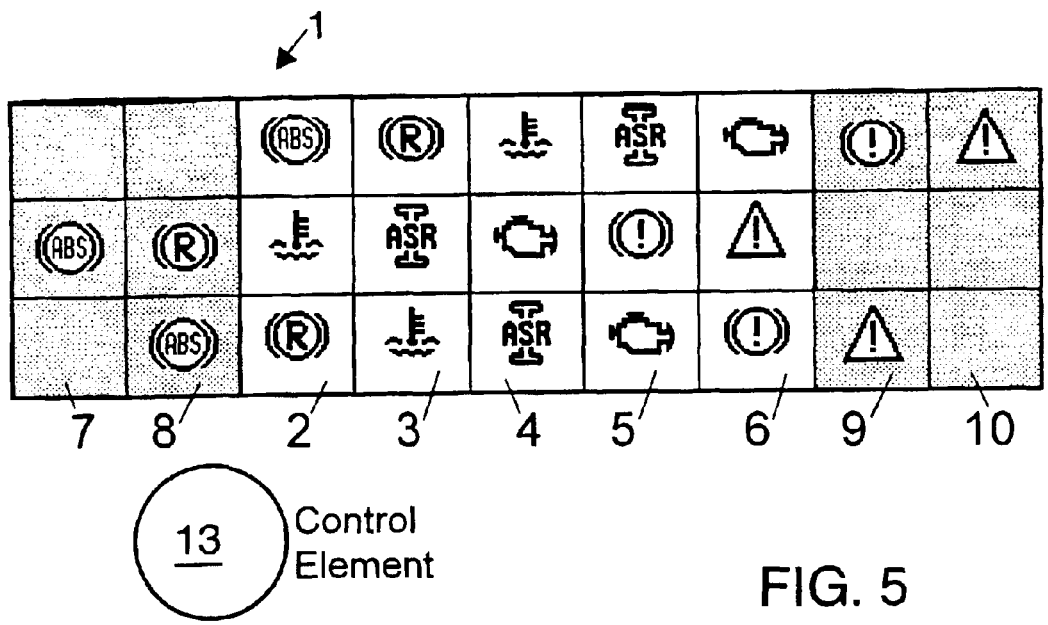

FIG. 4 shows what happens, according to the invention, if more pictograms than symbol fields which are actually present within the active display area of the display unit are to be displayed simultaneously. The illustrated row of symbol fields which is composed of the five symbol fields 2, 3, 4, 5, 6 is expanded in virtual fashion toward its two sides with symbol fields 7, 8, 9, 10 which are not visible to the viewer on the display unit. In addition, a control element 13 which is connected to the control unit of the device is also provided, with which element it is then possible, as illustrated in FIG. 5, to display in the symbol fields a coherent section of the row of pictograms which are to be displayed if more pictograms are to be displayed simultaneously than symbol fields which are present within the active display area of the display unit. For this purpose, the driver activates the control element 13, as a result of which he can, as it were, displace the displayed pictograms in the row of symbol fields. If he wishes to view the pictograms of older messages which are thus pushed to the right-hand edge of the display unit into the invisible 13 to shift a window composed of a fixed number of symbol fields over the row of symbol fields composed of a linear arrangement of symbol fields. Both representations have the same effect for the viewer and are caused by the same actuation of the display unit by the control unit.

Figure 6:
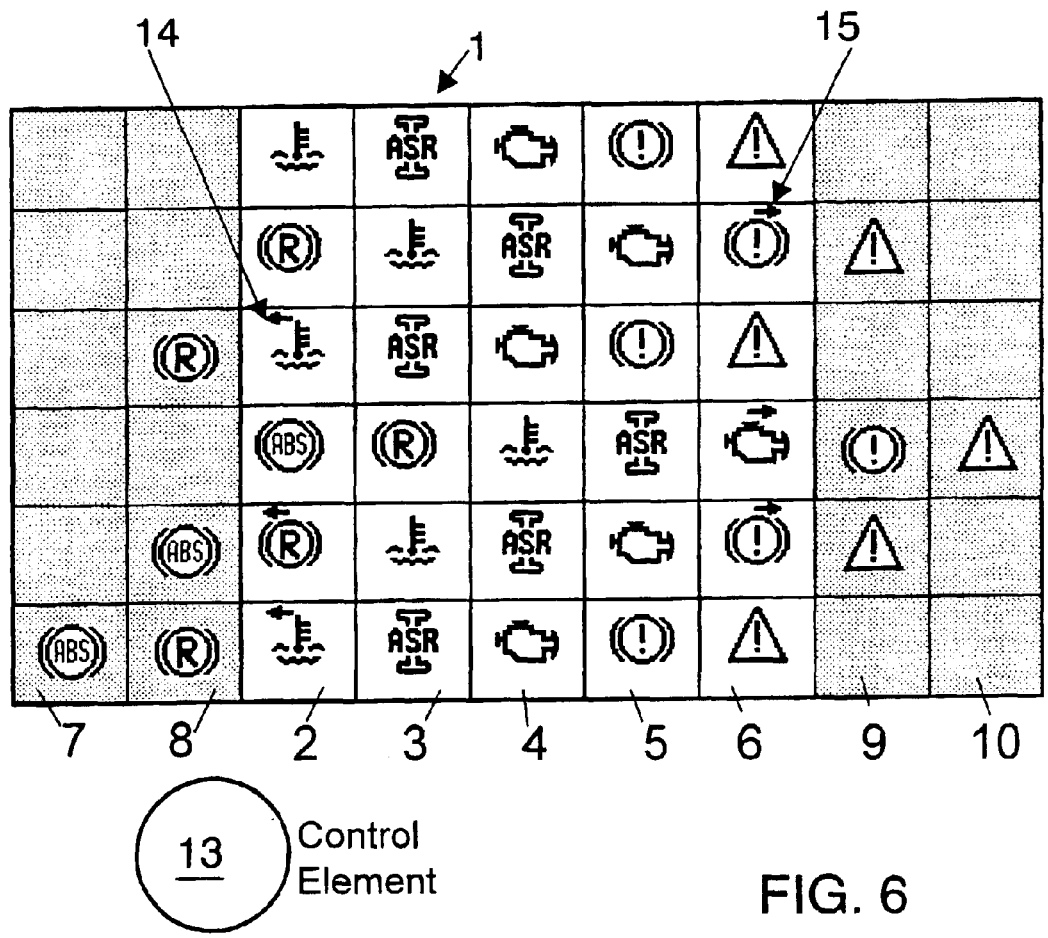

The control unit advantageously provides the driver with an indication by fading in a visual character 14, 15 on the display unit, preferably at the outer edge of the active display area if there are pictograms in the invisible symbol fields 7, 8, 9, 10. This embodiment of the device according to the invention is shown in FIG. 6. The indication with a visual character can then be given, for example, by means of an appropriately directed arrow 14, 15, which appears in the symbol field 2 or 6 which is arranged at the edge of the active display area, if an invisible symbol field 8 or 9 which contains a pictogram adjoins this symbol field 2 or 6.

Figure 7:
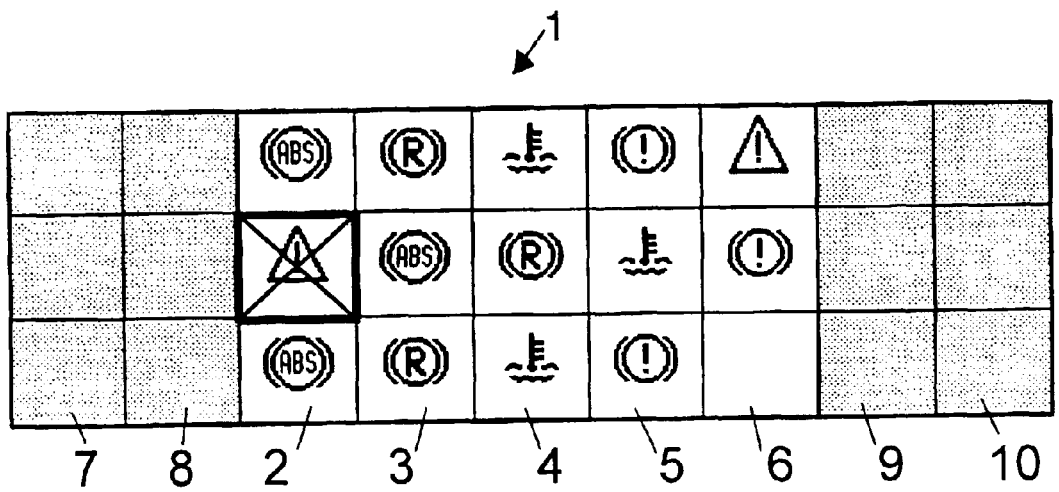

If messages from measuring, control and instrumentation equipment of the vehicle are canceled after a specific time because, for example, the operational status of a device in the vehicle is changed or a risk status no longer exists, for example if the light system has been switched off again or the fuel tank has been filled again, the control unit which is assigned to the display unit displaces—as is clear from FIG. 7—the pictogram, which has been displayed until then for the corresponding message, into that symbol region, he pushes the entire row of symbol fields to the left, by means of the control element 13, until the pictograms which are of interest to him become visible on the active display area of the display unit. He can also restore the original section from the row of symbol fields by displacing the row of symbol fields to the right again with the control element 13. The displacement of the row of symbol fields is only virtual here, that is to say only an effect which can be perceived by the viewer, but which is actually caused by a corresponding actuation of the symbol fields which are visible on the active display area of the display unit. This is because in the technical implementation, the pictograms are successively shifted into a memory of the row assigned to the control unit, from which memory the control unit reads out the pictograms in accordance with the setting selected with the control element 13, and displays them in the symbol fields 2, 3, 4, 5, 6 which are visible on the display unit. The number of pictograms which can be viewed in their entirety in the row of symbol fields and which can be represented in the symbol fields which are visible and those which are not visible on the active display area of the display unit is thus dependent on the memory capacity of the memory which is assigned to the control unit. Instead of referring to the displacement of the row of symbol fields, one could also say that the viewer uses the control element field in which, according to the convention, the latest message is always displayed. In the illustration in FIG. 1, this would be the symbol field 2. The gap which is produced as a result of the fact that the pictogram with the deleted message is removed from the row of symbol fields is automatically closed by virtue of the fact that during the placing of the removed pictogram in symbol field 2 all the pictograms which are to the right of the symbol field 2 are simultaneously displaced to the right by one symbol field.

The approach described here for deleting a message also applies in the event that a pictogram is not located in the visible region of the row of symbol fields at the time when the message on which it is based is canceled. If at the time when a message is canceled, the pictograms of the latest messages are not represented in the visible symbol fields on the active area of the display unit because the control element 13 has been activated, a preceding displacement of the row of symbol fields is reversed by the control unit, in accordance with FIG. 8, and that pictogram whose message has been canceled is simultaneously displayed in symbol field 2. Here, the individual working steps which are carried out by the control unit do not lead to a rapid sequence of successively displayed representations on the display unit but rather the final state of all the changes is immediately displayed in the symbol fields 2, 3, 4, 5, 6 which are visible on the display unit—as illustrated in the third line of FIG. 8.

Figure 8:
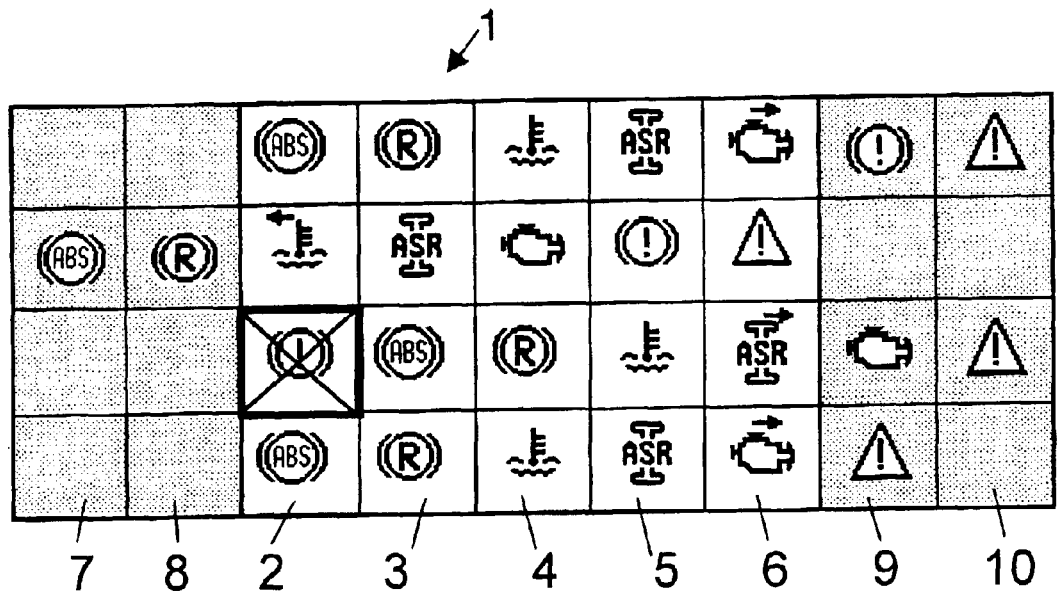

In order to be able to point out in particular that we are concerned with a message whose cause has been eliminated, it is advantageous to mark the appropriate pictogram in a particular way. The marking could comprise, for example, a comparison with the representation of the other pictograms in an inverted representation of the filling-in color of the pictogram and of the background color of the symbol field or the pictogram could, as illustrated in FIGS. 7 and 8, have a bar through it in the appropriate symbol field, be outlined or be represented in some other clearly recognizable and distinguishable fashion.

Moreover, the control unit which is assigned to the display unit starts a timer when a message is canceled. After a preferably adjustable retention time, which can have a standard length of 10 to 15 seconds, the pictogram which is assigned to the canceled message is then finally deleted from the row of symbol fields. All the pictograms to the right of the pictogram which is to be deleted are then pushed to the left by one symbol field by the control unit, in order to close the gap in the row of symbol fields which has been produced by the deletion. The retention time should be selected such that the driver has sufficient time to consciously perceive the change in the displayed messages. On the other hand, canceled messages should not be retained for too long because as a result the display would be unnecessarily overloaded with messages which are no longer valid. Moreover, the control element 13 could also be configured in such a way that the driver can acknowledge, by activating this control element 13, that he has noticed a canceled message, in response to which the pictogram which is assigned to the message, and marked owing to the canceling of the message, disappears and is thus removed from the row of symbol fields without waiting for a retention time to expire.

If a new message is to be displayed during the retention time until a pictogram is ultimately deleted, this new message is displayed, with the pictogram assigned to it, in the way already described, in the symbol field 2 which is intended in each case for the latest message, all the pictograms which were previously in the row of symbol fields, that is to say also a pictogram which is about to be deleted, and is marked for this reason, being displaced to the right by one symbol field.

The control element 13 which is used to select the visible section from the row of symbol fields can be implemented, for example, as a rotary actuator, slide, momentary-contact switch or as a combination of these refinements. In some applications it may also be appropriate to support the driver's perception of new messages, or of messages whose status has changed, by means of audible signals. For this case, a signal transmitter which can be controlled by the control unit is provided, said signal transmitter outputting an audible signal if a new pictogram is displayed or a pictogram is to be deleted from the display.

The solution which has been found has the advantage that it avoids all the disadvantages of a continuous conveyor belt display. Conveyor belt displays in which all the current messages are successively displayed with a specific time frequency give a very unsteady impression and require the driver to look at the display at the correct time for a specific item of information. However, this is precisely something which cannot be demanded of the driver because he has to concentrate predominantly on his actual task of driving.

Instead, the solution which has been found provides the driver with the possibility of using the control element 13 to retrieve onto the display unit the information he requires whenever he wishes, provided that there are so many messages present that they cannot all be displayed simultaneously in the symbol fields on the active area of the display unit. Otherwise, he sees the pictograms of the messages which are present without even having to activate the control element 13.

The information is represented in a way which can be easily perceived, by means of pictograms which are known to the driver. It is also the case that the driver is not confronted with a flood of simultaneously displayed messages, but rather he decides himself which information he wishes to see, but he is still provided with a new message or a change to a message, because, in this case, the control unit which is assigned to the display unit intervenes actively in what is displayed. The representation of information is also selected in such a way that the chronological sequence of the messages can be recognized by the driver at any time.

We claim:

1. A method for displaying pictograms with a device arranged in a vehicle, the device comprising a control unit and a display unit, in particular a liquid crystal display, controlled by the control unit, the method comprising the steps of
   a) displaying the pictograms in symbol fields (2, 3, 4, 5, 6) of the display unit, the symbol fields (2, 3, 4, 5, 6) being arranged one next to the other to form a row of symbol fields,
   b) displaying each pictogram which is to be newly displayed in a specific symbol field (2) of the row of symbol fields until a pictogram with a more recent time priority is to be displayed,
   c) displacing all the pictograms which have already been displayed in the row of symbol fields by one symbol field when a new pictogram is displayed,
   d) expanding the row of symbol fields (2, 3, 4, 5, 6) visible on the display unit at least one of start and end of said row in virtual fashion by invisible symbol fields (7, 8, 9, 10), for displacing pictograms onto these invisible symbol fields (7, 8, 9, 10) if a number of pictograms to be displayed exceeds a number of symbol fields (2, 3, 4, 5, 6) visible on the display unit, wherein a section of pictograms arranged in the visible symbol fields can be displayed on the display unit by a control element (13), wherein said control element (13) is able to displace the row of symbol fields.

2. The method as claimed in claim 1, wherein a pictogram to be deleted is removed from its location in the row of symbol fields thereyby creating a gap in the row of symbol fields and to displayed in a symbol field (2) which is provided for each pictogram to be newly displayed, said pictograms located next to said symbol field (2) are displaced by one symbol field until the gap in said row of symbol fields produced by the removal of the pictogram which is to be deleted is closed again.

3. The method as claimed in claim 1, wherein the viewing of a pictogram to be deleted can be acknowledged by activating the control element (13) causing the pictogram to be deleted to be immediately removed from the row of symbol fields.

4. The method as claimed in claim 2, wherein the control unit reverses a preceding displacement of the row of symbol fields, whereby the pictograms last displayed are displayed on the symbol fields (2, 3, 4, 5, 6) which are visible in the display unit, together with that pictogram whose message has been canceled, if, at the time when a message was canceled, the pictograms of the latest messages were not represented in visible symbol fields in the active area of the display unit because the control element (13) had been activated.

5. The method as claimed in claim 1, wherein a pictogram which is to be deleted is displayed in the symbol field (2) which in provided in the row of symbol fields for displaying each pictogram to be newly displayed is marked so as to be distinguishable from the other pictograms.

6. The method as claimed in claim 5, wherein the marking of a pictogram to be deleted comprises inverting a filling-in color and/or background color thereof.

7. The method as claimed in claim 5, wherein the marking of a pictogram to be deleted comprises at least one of outlining the symbol field or putting a bar through the pictogram.

8. The method as claimed in claim 1, wherein the control unit closes the gap in the row of symbol fields produced as a result of the deletion of a pictogram by allowing all the pictograms having an older time priority to move on by one symbol field.

9. The method as claimed in claim 3, wherein the control unit reverses a preceding displacement of the row of symbol fields, whereby the pictograms last displayed are displayed on the symbol fields (2, 3, 4, 5, 6) which are visible in the display unit, together with that pictogram whose message has been canceled, if, at the time when a message was canceled, the pictograms of the latest messages were not represented in visible symbol fields in the active area of the display unit, because the control element (13) had been activated.

* * * * *